(12) United States Patent
Takahashi

(10) Patent No.: US 8,463,027 B2
(45) Date of Patent: Jun. 11, 2013

(54) INFORMATION PROCESSING APPARATUS DETERMINING GROUP CORRESPONDING TO INPUT SPECTRAL DATA

(75) Inventor: Kosei Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 13/312,693

(22) Filed: Dec. 6, 2011

(65) Prior Publication Data

US 2012/0148150 A1 Jun. 14, 2012

(30) Foreign Application Priority Data

Dec. 10, 2010 (JP) ................................ 2010-276125

(51) Int. Cl.
*G06K 9/00* (2006.01)

(52) U.S. Cl.
USPC .......................................... 382/162; 382/224

(58) Field of Classification Search
USPC .......................................... 382/162, 191, 225
See application file for complete search history.

(56) References Cited

U.S. PATENT DOCUMENTS

| 2007/0139734 A1* | 6/2007 | Fan et al. ....................... 358/504 |
| 2007/0177819 A1* | 8/2007 | Ma et al. ....................... 382/284 |
| 2008/0319712 A1* | 12/2008 | Claps ............................ 702/189 |
| 2009/0161127 A1* | 6/2009 | Schweid et al. ............... 358/1.9 |

FOREIGN PATENT DOCUMENTS

JP 2006-053070 A 2/2006

\* cited by examiner

*Primary Examiner* — Phuoc Tran
(74) *Attorney, Agent, or Firm* — Canon USA Inc IP Division

(57) ABSTRACT

An error calculation unit calculates a difference between approximate spectral data obtained by approximating input spectral data using principal component data and the input spectral data for each of a plurality of groups. An error determination unit determines to which of a plurality of groups the input spectral data belongs based on a comparison result by the error calculation unit.

9 Claims, 13 Drawing Sheets

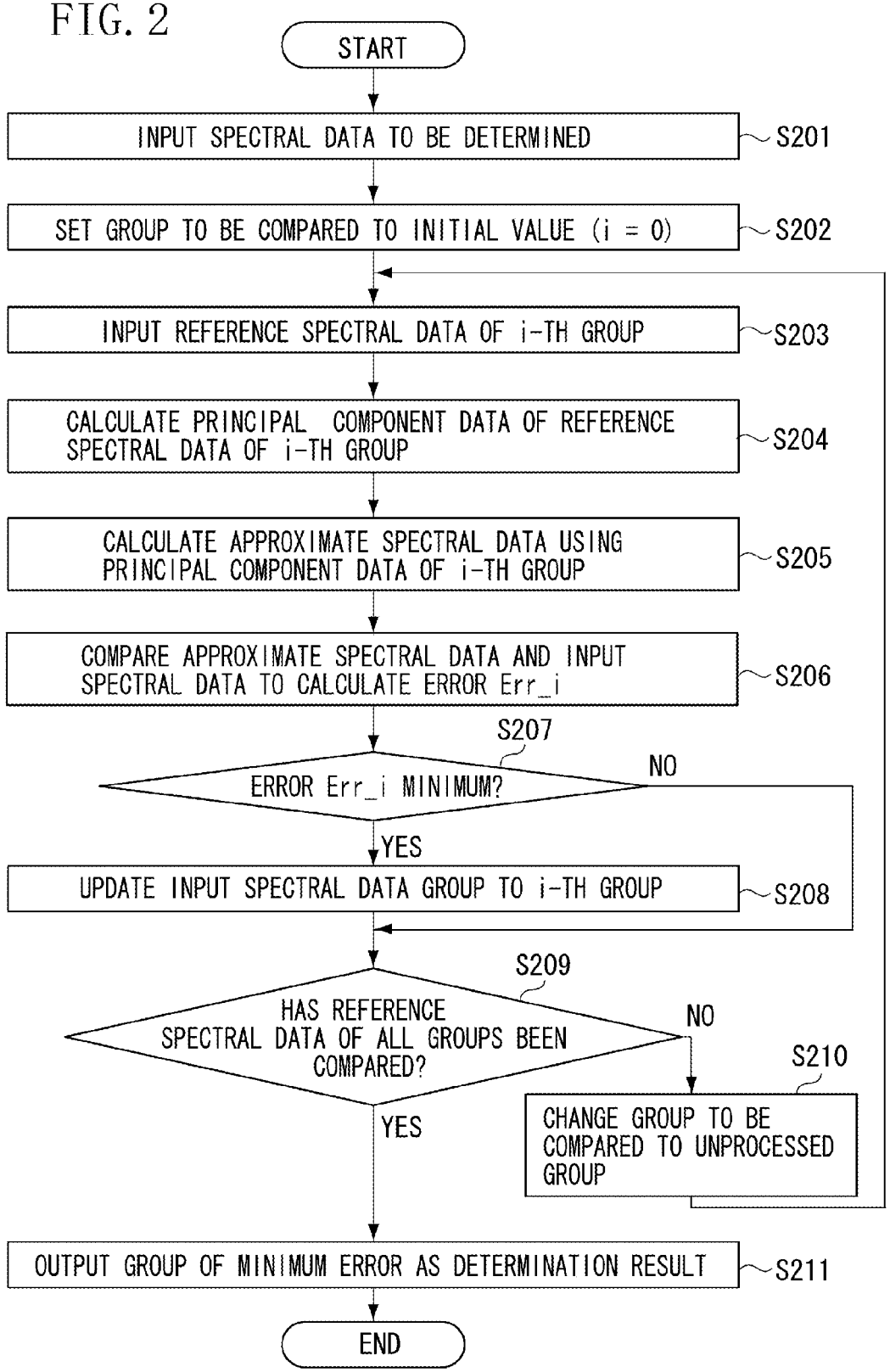

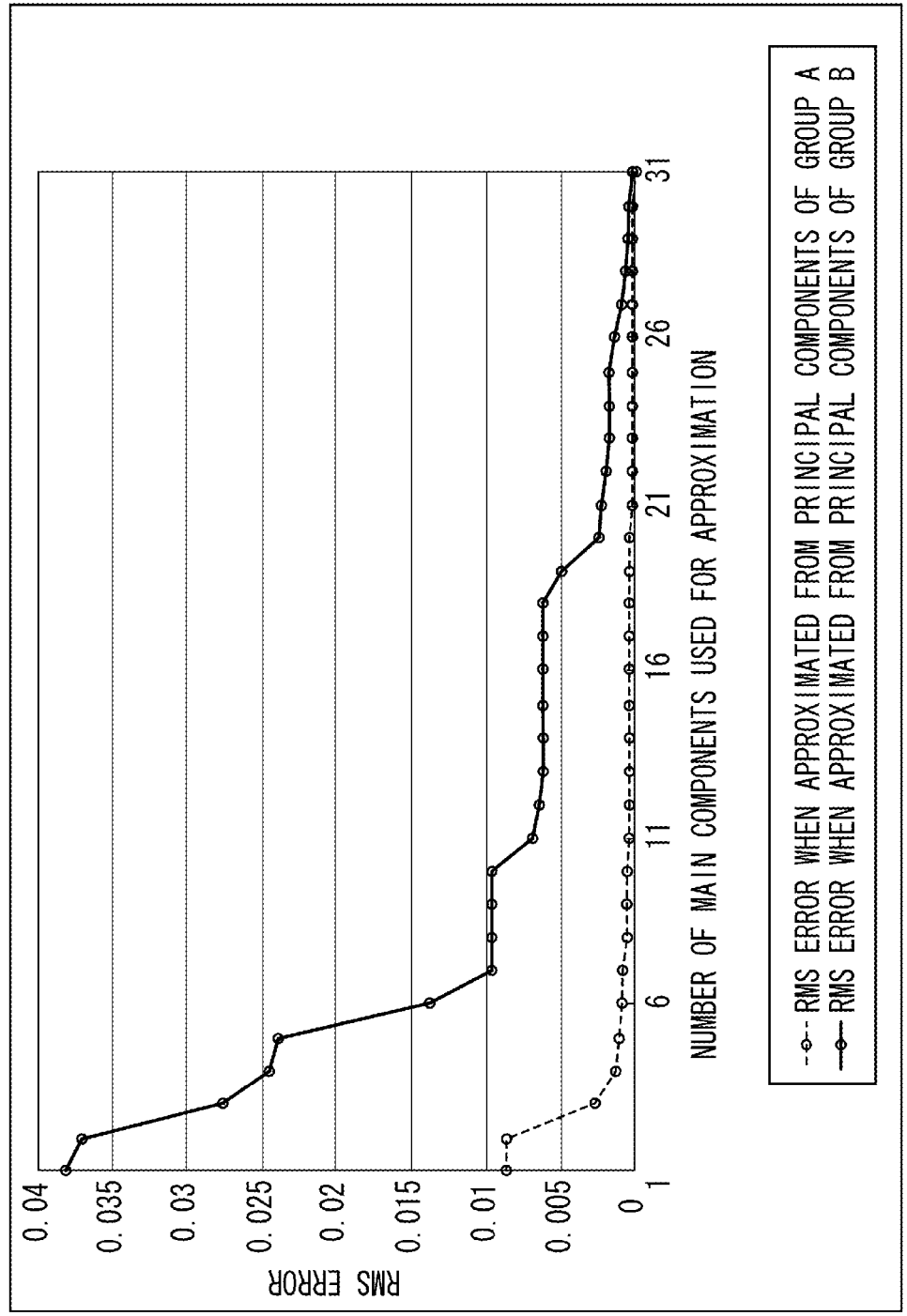

INFORMATION PROCESSING APPARATUS DETERMINING GROUP CORRESPONDING TO INPUT SPECTRAL DATA

BACKGROUND OF THE INVENTION

1. Field of the Invention

One of the aspects of present invention relates to a technique for categorizing input spectral data into a group having close characteristics.

2. Description of the Related Art

In recent years, devices handling images such as digital cameras, displays, and printers have undergone evolution, and a multi-primary color technique has been under development as a technology development relating to color reproduction. Particularly in image input devices such as digital cameras, technology development relating to a multi-band camera that takes a picture using four color filters or more exceeding the number of conventional three primary colors (red, green, and blue) color filters is in progress.

One advantage of the technology to take a picture of a subject by a multi-band camera is that spectral data of the subject, that is, the spectral reflectance can be estimated with high precision. The spectral reflectance is subject-specific color information that does not depend on illumination information, and coloring of the subject under an illumination light source that is different from the light source when an image is captured can be estimated with high precision by acquiring spectral data.

In addition to color reproduction, a detailed analysis of color information can be performed using the spectral data. FIG. 10 illustrates an example of two spectral reflectances. The spectral reflectances illustrated in FIG. 10 match in tristimulus values under a specific light source (D50). In other words, colors cannot be distinguished when XYZ values are compared. However, as is evident from FIG. 10, two pieces of spectral data are significantly different and so differences of colors that cannot be determined by using the XYZ values can be determined by analyzing the spectral data.

According to Japanese Patent Application Laid-Open No. 2006-53070, the types of pigments used in coloring of the cultural properties are analyzed by the spectral data in color analysis of cultural properties. Identification of coloring materials used in coloring of the cultural properties can be effective information for, for example, recovery of fading or restoration work.

When compared with the RGB values, XYZ values, or Lab values, spectral data has a huge amount of data (dimensionality) needed to represent one color. While the RGB values, XYZ values, and Lab values are three-dimensional data representing one color by three values of X, Y, and Z, spectral data is 31-dimensional data when the wavelength range of 400 nm to 700 nm is sampled at intervals of 10 nm.

According to the technology discussed in Japanese Patent Application Laid-Open No. 2006-53070, pigments used for coloring of a colored member are estimated by comparing the spectral reflectance of the colored member with spectral data stored in advance. However, spectral data has a huge dimensionality when compared with tristimulus value data such as XYZ data and thus, the spectral reflectance of the colored member is considered to rarely match the spectral data stored in advance. Therefore, an erroneous determination may be made if the spectral reflectances are simply compared.

SUMMARY OF THE INVENTION

According to an aspect of the present invention, an information processing apparatus for determining a group corresponding to input spectral data input thereto from among a plurality of groups includes an input unit configured to input principal component data obtained by performing a principal component analysis on a plurality of pieces of reference spectral data for each of the plurality of groups, a calculation unit configured to calculate a difference between approximate spectral data obtained by approximating the input spectral data using the principal component data and the input spectral data for each of the plurality of groups, and a determination unit configured to determine a group corresponding to the input spectral data from the difference calculated by the calculation unit.

According to one of the aspects of the present invention, for example, input spectral data can be categorized with high precision.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flow chart illustrating processing of the image processing apparatus according to the first exemplary embodiment.

FIG. 7 illustrates changes in root mean square (RMS) error values when the number of principal components to approximate the input spectral data is changed according to an exemplary embodiment.

DESCRIPTION OF THE EMBODIMENTS

Various exemplary embodiments, features, and aspects of the invention will be described in detail below with reference to the drawings.

Figure 1:
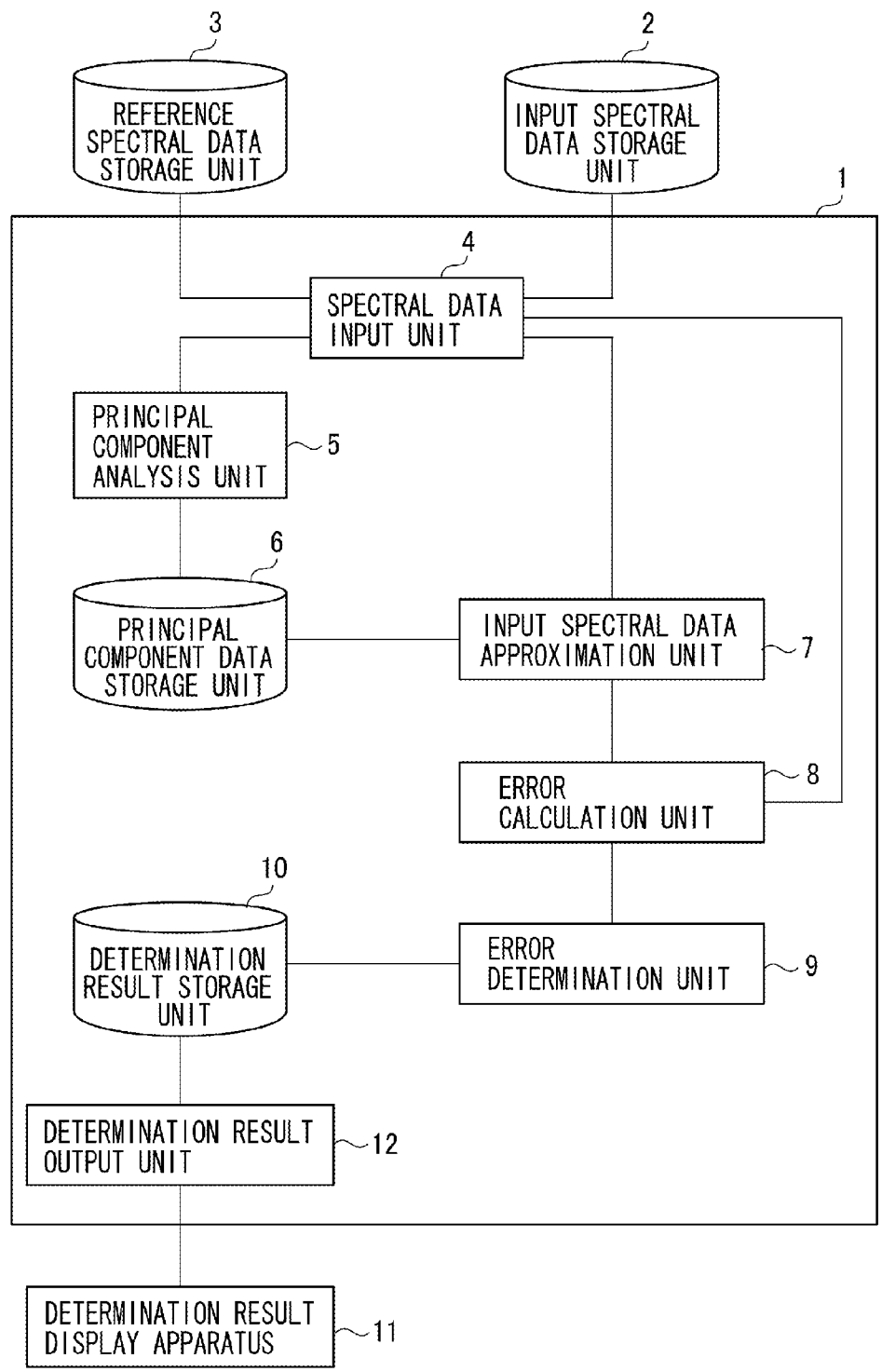
FIG. 1 illustrates a configuration of an image processing apparatus according to a first exemplary embodiment of the present invention.

FIG. 1 illustrates a configuration of an image processing apparatus according to a first exemplary embodiment. In FIG. 1, an image processing apparatus 1 can categorize spectral data. An input spectral data storage unit 2 stores input spectral data to be categorized. A reference spectral data storage unit 3 stores reference spectral data pieces which are separated into a plurality of groups in advance.

A spectral data input unit 4 reads the input spectral data stored in the input spectral data storage unit 2 and the reference spectral data stored in the reference spectral data storage unit 3. A principal component analysis unit 5 performs a principal component analysis of the reference spectral data input from the spectral data input unit 4. A principal component data storage unit 6 stores principal component data calculated by the principal component analysis unit 5. An input spectral data approximation unit 7 targets the input spectral data input from the spectral data input unit 4 and calculates approximate spectral data using the principal component data stored in the principal component data storage unit 6.

An error calculation unit 8 compares the input spectral data input from the spectral data input unit 4 and the approximate spectral data calculated by the input spectral data approximation unit 7 to calculate an error therebetween. An error determination unit 9 determines whether the error calculated by the error calculation unit 8 is the minimum among errors calculated heretofore. A determination result storage unit 10 stores a determination result determined by the error determination unit 9.

A determination result display apparatus 11 is a cathode ray tube (CRT), a liquid crystal display (LCD) monitor, or the like and displays the determination result. A determination result output unit 12 outputs the determination result stored in the determination result storage unit 10 to the determination result display apparatus 11. The image processing apparatus 1 is configured as an application example of an information processing apparatus. The input spectral data is an example of first spectral data and the reference spectral data is an example of second spectral data.

FIG. 2 is a flow chart illustrating processing of the image processing apparatus 1 according to the first exemplary embodiment. The processing of the image processing apparatus 1 according to the first exemplary embodiment will be described in detail below with reference to FIG. 2.

In step S201, the spectral data input unit 4 reads input spectral data to be determined which is stored in the input spectral data storage unit 2. In step S202, the spectral data input unit 4 sets a group to be compared to an initial value (i=0).

In step S203, the spectral data input unit 4 reads reference spectral data belonging to the group (i-th group) set in step S202 from among the reference spectral data pieces stored in the reference spectral data storage unit 3.

In step S204, the principal component analysis unit 5 calculates principal component data by performing the principal component analysis of the reference spectral data read in step S203 and stores the principal component data in the principal component data storage unit 6. In step S205, the input spectral data approximation unit 7 targets the input spectral data input in step S201 and calculates approximate spectral data by approximation using the principal component data calculated in step S204.

In step S206, the error calculation unit 8 calculates an error $Err_{\_i}$ between the input spectral data and the approximate spectral data calculated in step S205.

In step S207, the error determination unit 9 compares the error $Err_{\_i}$ calculated in step S206 and errors ($Err_{\_0}$ to $Err_{\_(i-1)}$) in each group calculated heretofore to determine whether the error $Err_{\_i}$ is the minimum from a comparison result. If the error $Err_{\_i}$ is the minimum (YES in step S207), the processing proceeds to step S208. On the other hand, if the error $Err_{\_i}$ is not the minimum (NO in step S207), the processing proceeds to step S209.

In step S208, the error determination unit 9 updates the group into which the input spectral data is categorized to a group i currently being processed. More specifically, the error determination unit 9 associates and stores the number (i) of the group currently being processed and the error ($Err_{\_i}$) in the determination result storage unit 10.

In step S209, the error determination unit 9 determines whether the reference spectral data pieces of all groups stored in the reference spectral data storage unit 3 have been compared (whether the processing in step S203 and thereafter has been performed thereon). If the reference spectral data pieces of all groups have been compared (YES in step S209), the processing proceeds to step S211. On the other hand, if the reference spectral data pieces of all groups have not been compared (NO in step S209), the processing proceeds to step S210.

In step S210, the spectral data input unit 4 changes the group to be compared to an unprocessed group, and the processing returns to step S203. In step S211, the determination result output unit 12 outputs the group stored in the determination result storage unit 10 and whose error is the minimum to the determination result display apparatus 11 as the group to which the input spectral data belongs.

Details of the calculation method of the approximate spectral data in step S205 will be described. In the present exemplary embodiment, input spectral data itself is used as a characteristic amount of the input spectral data. Approximate spectral data obtained by approximating the input spectral data using lower-order principal component data of principal component data calculated by principal component analysis of the reference spectral data is used as a characteristic amount of the reference spectral data.

First, the method for approximating input spectral data O represented by Formula 1 by principal component data E represented by Formula 2 will be described.

$$O = \begin{bmatrix} O_{400} \\ O_{410} \\ O_{420} \\ \vdots \\ O_{700} \end{bmatrix}^T \quad \text{[Formula 1]}$$

$O_\lambda$: Reflectance of input spectral data at wavelength $\lambda$ $$E = \begin{bmatrix} e_{1,400} & e_{1,410} & e_{1,420} & \cdots & e_{1,700} \\ e_{2,400} & e_{2,410} & e_{2,420} & \cdots & e_{2,700} \\ e_{3,400} & e_{3,410} & e_{3,420} & \cdots & e_{3,700} \\ \vdots & \vdots & \vdots & \ddots & \vdots \\ e_{31,400} & e_{31,410} & e_{31,420} & \cdots & e_{31,700} \end{bmatrix} \quad \text{[Formula 2]}$$

$e_{n,\lambda}$: Reflectance of the n-th principal component at wavelength $\lambda$ The input spectral data O can be represented by Formula 3 as a linear sum of the principal component data E. If the input spectral data and the reference spectral data are 31-dimensional data, principal component data can be calculated up to the 31st principal component, and an approximation error from the input spectral data becomes 0 by using all components up to the 31st principal component.

$$O = \begin{bmatrix} O_{400} \\ O_{410} \\ O_{420} \\ \vdots \\ O_{700} \end{bmatrix}^T = AE \qquad \text{[Formula 3]}$$

$$= \begin{bmatrix} (a_{1,400} \times e_{1,400}) + (a_{2,400} \times e_{2,400}) + \ldots + (a_{31,400} \times e_{31,400}) \\ (a_{1,410} \times e_{1,410}) + (a_{2,410} \times e_{2,410}) + \ldots + (a_{31,410} \times e_{31,410}) \\ (a_{1,420} \times e_{1,420}) + (a_{2,420} \times e_{2,420}) + \ldots + (a_{31,420} \times e_{31,420}) \\ (a_{1,700} \times e_{1,700}) + (a_{2,700} \times e_{2,700}) + \ldots + (a_{31,700} \times e_{31,700}) \end{bmatrix}^T$$

The coefficient A in Formula 3 can be calculated by Formula 4 using the method of least squares.

$$A = [OE^T][EE^T]^{-1} \qquad \text{[Formula 4]}$$

If a case when the order of the principal component can be used up to the N-th principal component (N<31) is considered, Formula 3 becomes a linear sum up to the N-th principal component and is represented by Formula 5.

$$O = \begin{bmatrix} O_{400} \\ O_{410} \\ O_{420} \\ \vdots \\ O_{700} \end{bmatrix}^T = BE \qquad \text{[Formula 5]}$$

$$= \begin{bmatrix} (b_{1,400} \times e_{1,400}) + (b_{2,400} \times e_{2,400}) + \ldots + (b_{N,400} \times e_{N,400}) \\ (b_{1,410} \times e_{1,410}) + (b_{2,410} \times e_{2,410}) + \ldots + (b_{N,410} \times e_{N,410}) \\ (b_{1,420} \times e_{1,420}) + (b_{2,420} \times e_{2,420}) + \ldots + (b_{N,420} \times e_{N,420}) \\ (b_{1,700} \times e_{1,700}) + (b_{2,700} \times e_{2,700}) + \ldots + (b_{N,700} \times e_{N,700}) \end{bmatrix}^T$$

In Formula 5, like in Formula 3, the coefficient B in Formula 5 can be calculated by Formula 6 using the method of least squares. However, the principal component data E used in Formula 6 is data of up to the N-th principal component (N<31).

$$B = [OE^T][EE^T]^{-1} \qquad \text{[Formula 6]}$$

In Formula 5, since the order of the principal component is N (N<31), an error arises when the input spectral data O is approximated. In this case, the error becomes smaller with increasingly closer characteristics of the reference spectral data from which principal component data is calculated and the input spectral data and thus, the input spectral data is considered to be likely to belong to a group of the reference spectral data used when the principal component data with a smaller error is calculated.

The accuracy of approximation of input spectral data when principal component data calculated from reference spectral data of different groups is used will be described. In the description, spectral reflectances of leaves contained in Standard object color spectral database for color reproduction evaluation (SOCS) (JIS-TR X 0012) are used as a concrete example.

Figure 3A:
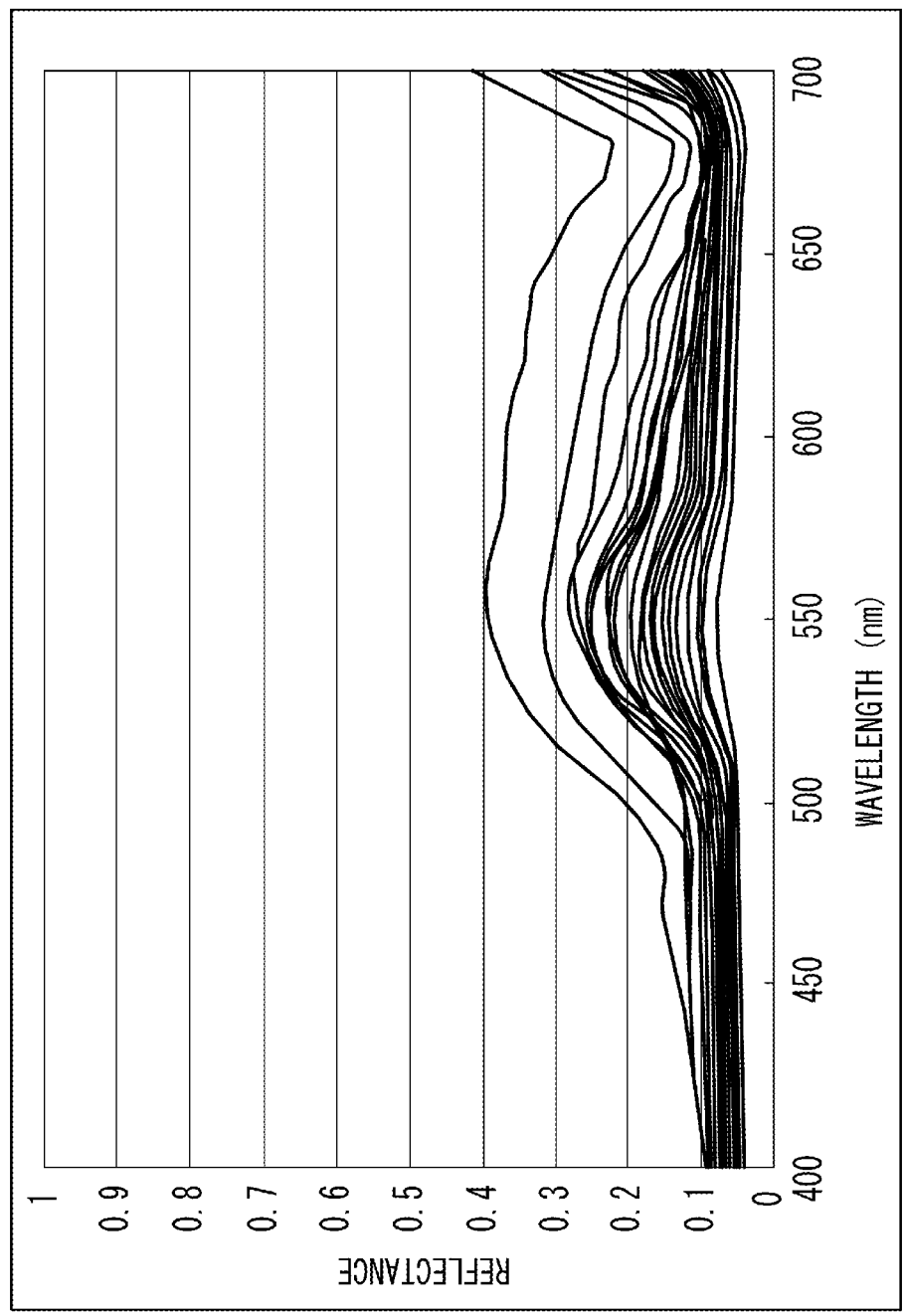
FIGS. 3A and 3B illustrate reference spectral data of groups A and B according to an exemplary embodiment.
Figure 3B:
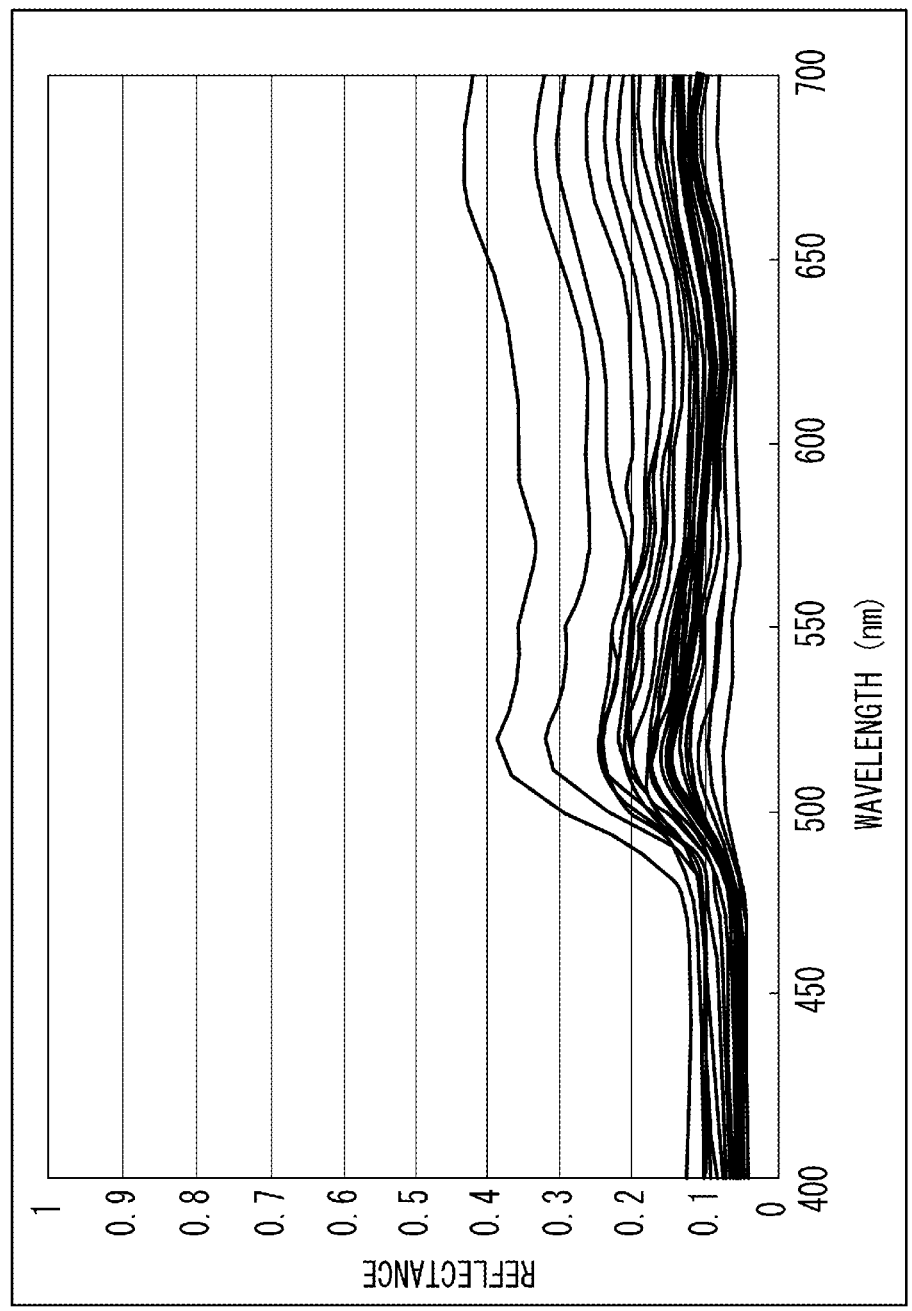

Forty-six colors are extracted from spectral reflectances of 92 colors thereof to use as reference spectral data pieces of a Group A. Further, the reference spectral data pieces of 46 colors of the Group A and reference spectral data of print output whose colors match (XYZ values of tristimulus values match) under a D50 light source are set as the reference spectral data of a Group B. The reference spectral data of the Group A is illustrated in FIG. 3A and the reference spectral data of the Group B is illustrated in FIG. 3B.

Figure 4A:
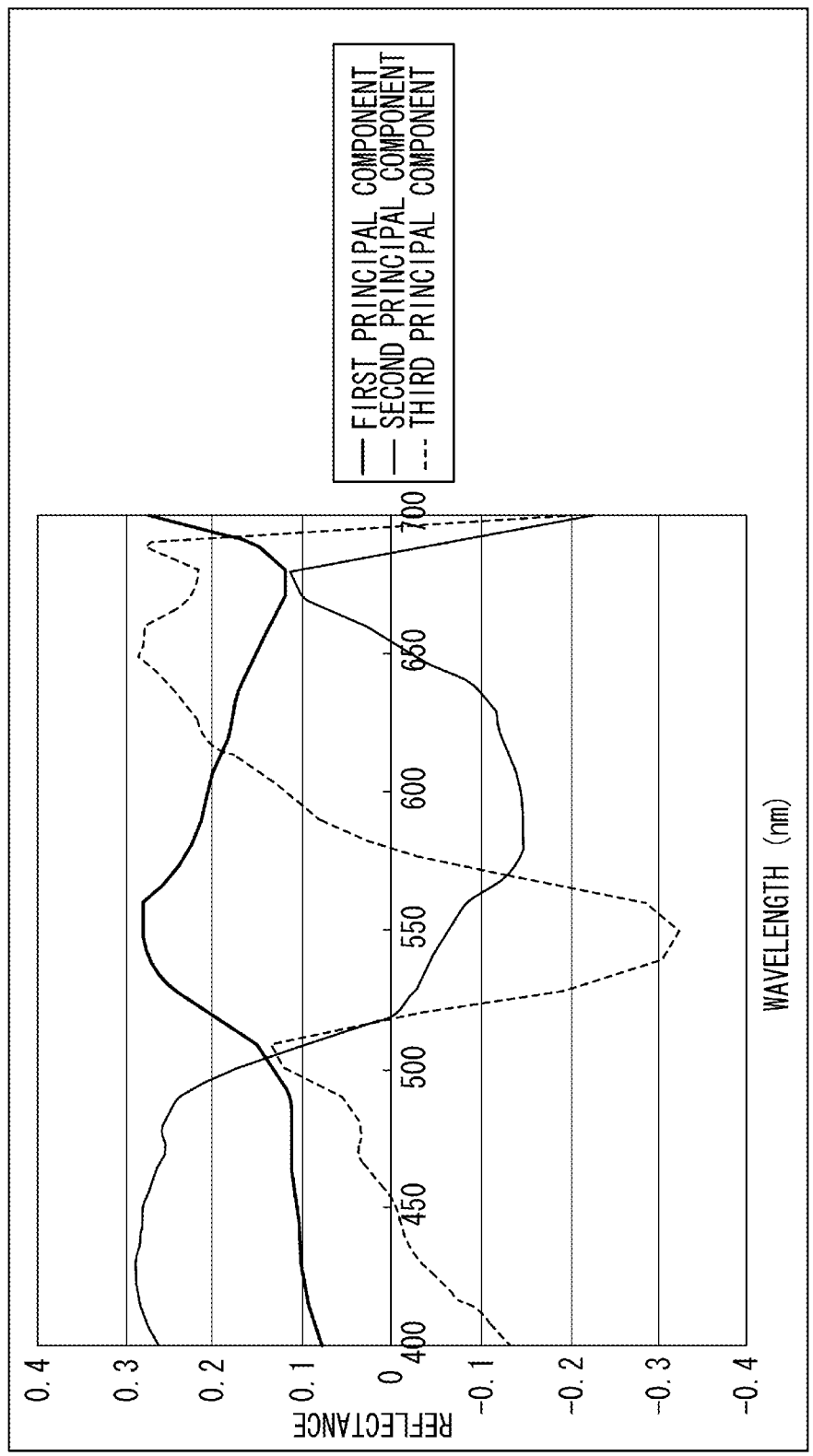
FIGS. 4A and 4B illustrate up to third principal components of principal component data calculated from the reference spectral data of the groups A and B according to an exemplary embodiment.
Figure 4B:
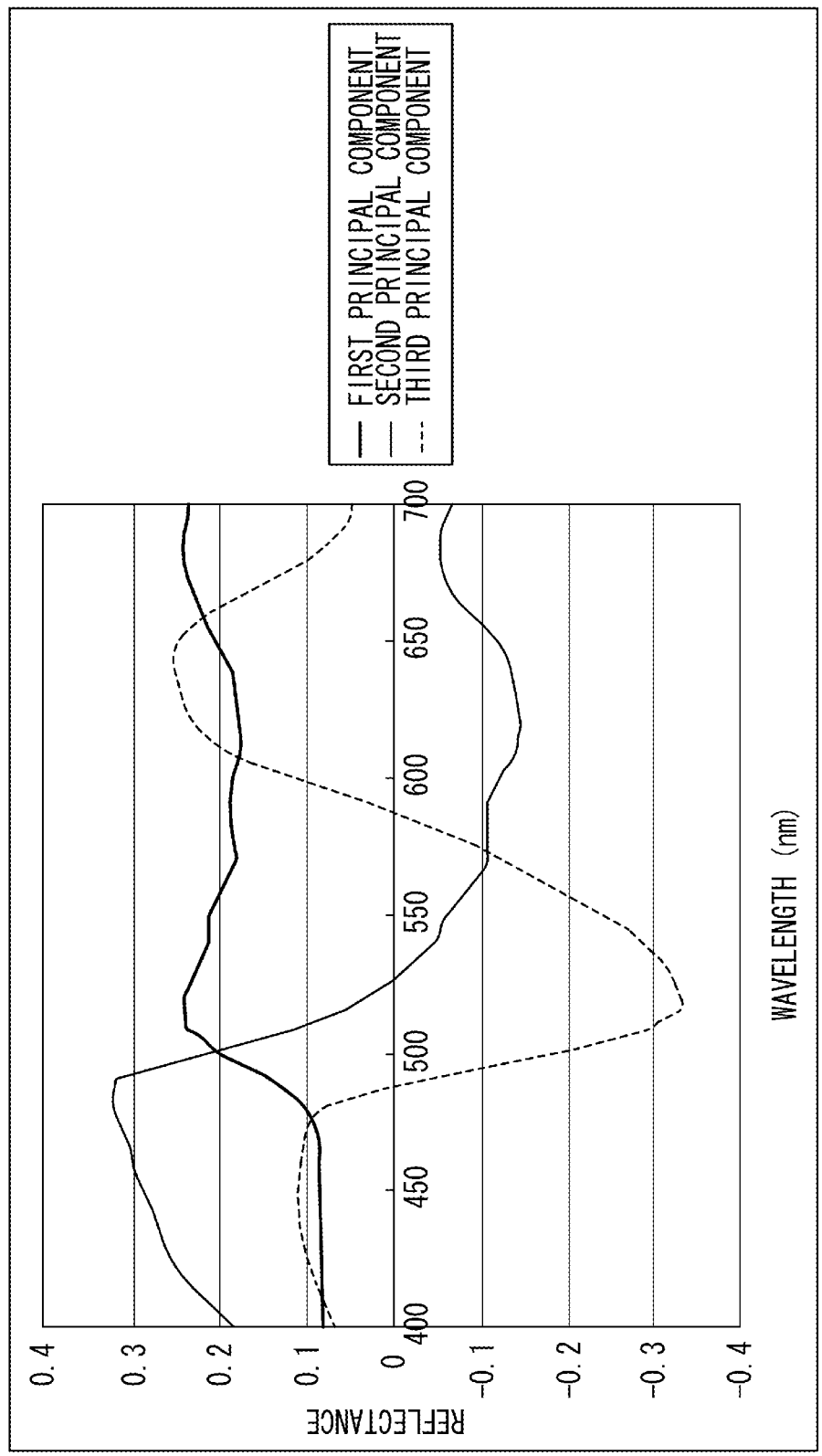

Further, principal components up to the third principal component of principal component data calculated from the reference spectral data of the Group A are illustrated in FIG. 4A. Principal components up to the third principal component of principal component data calculated from the reference spectral data of the Group B are illustrated in FIG. 4B.

Figure 5:
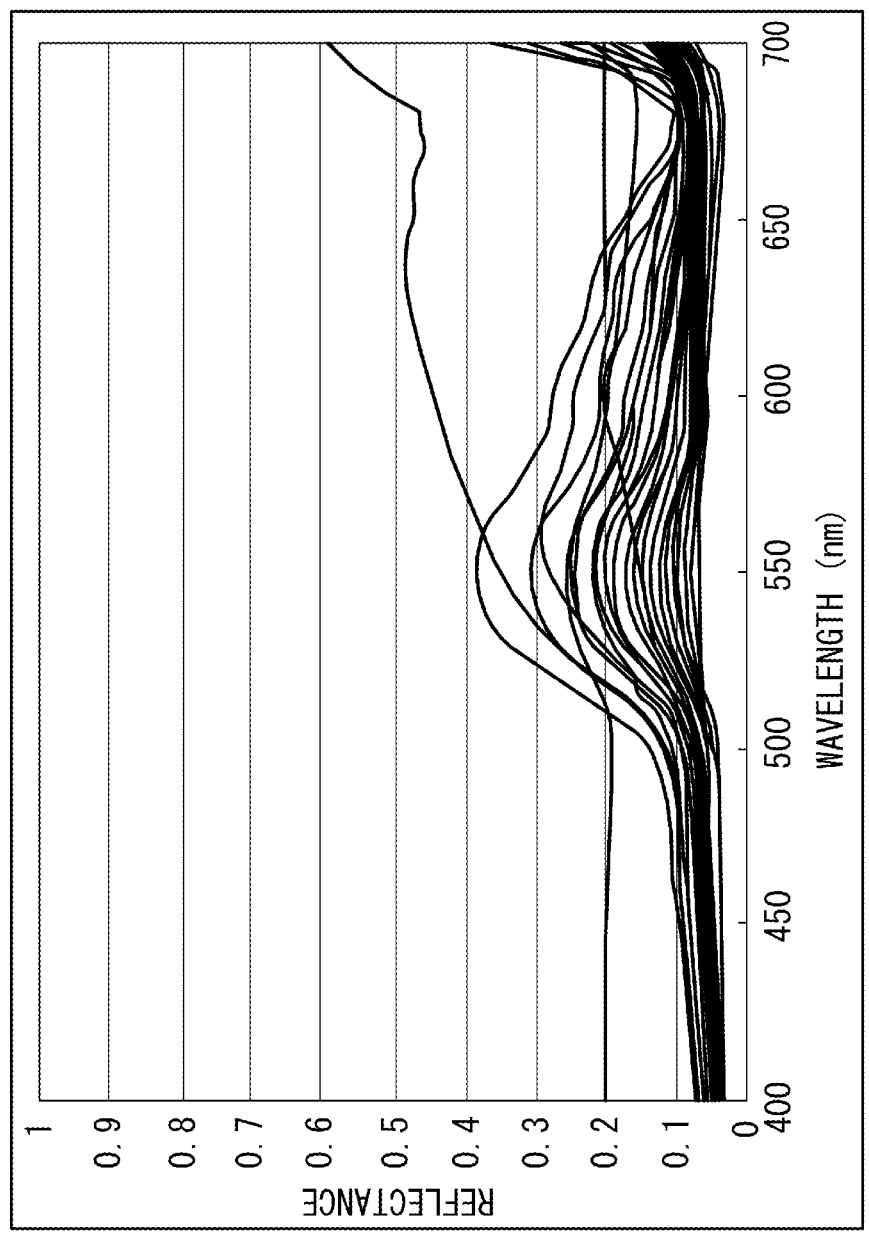
FIG. 5 illustrates input spectral data according to an exemplary embodiment.

Spectral reflectances of reprincipaling 46 colors excluding 46 colors extracted as the reference spectral data from the spectral reflectances of 92 colors of leaves in the SOCS database are input as input spectral data. The input spectral data pieces are illustrated in FIG. 5.

Figure 6A:
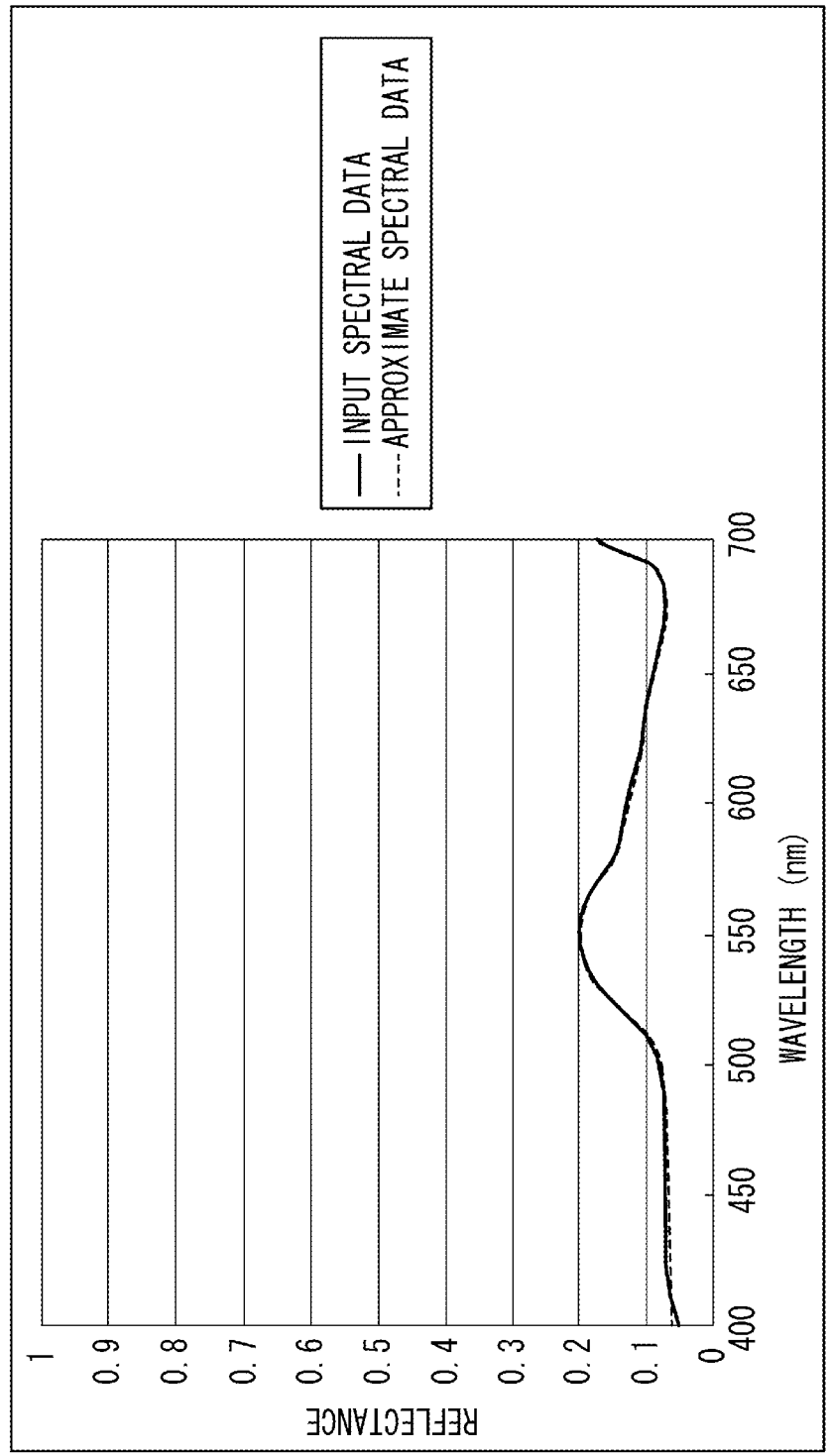
FIGS. 6A and 6B illustrate approximate results when the principal component data calculated from the reference spectral data of the groups A and B is used according to an exemplary embodiment.
Figure 6B:
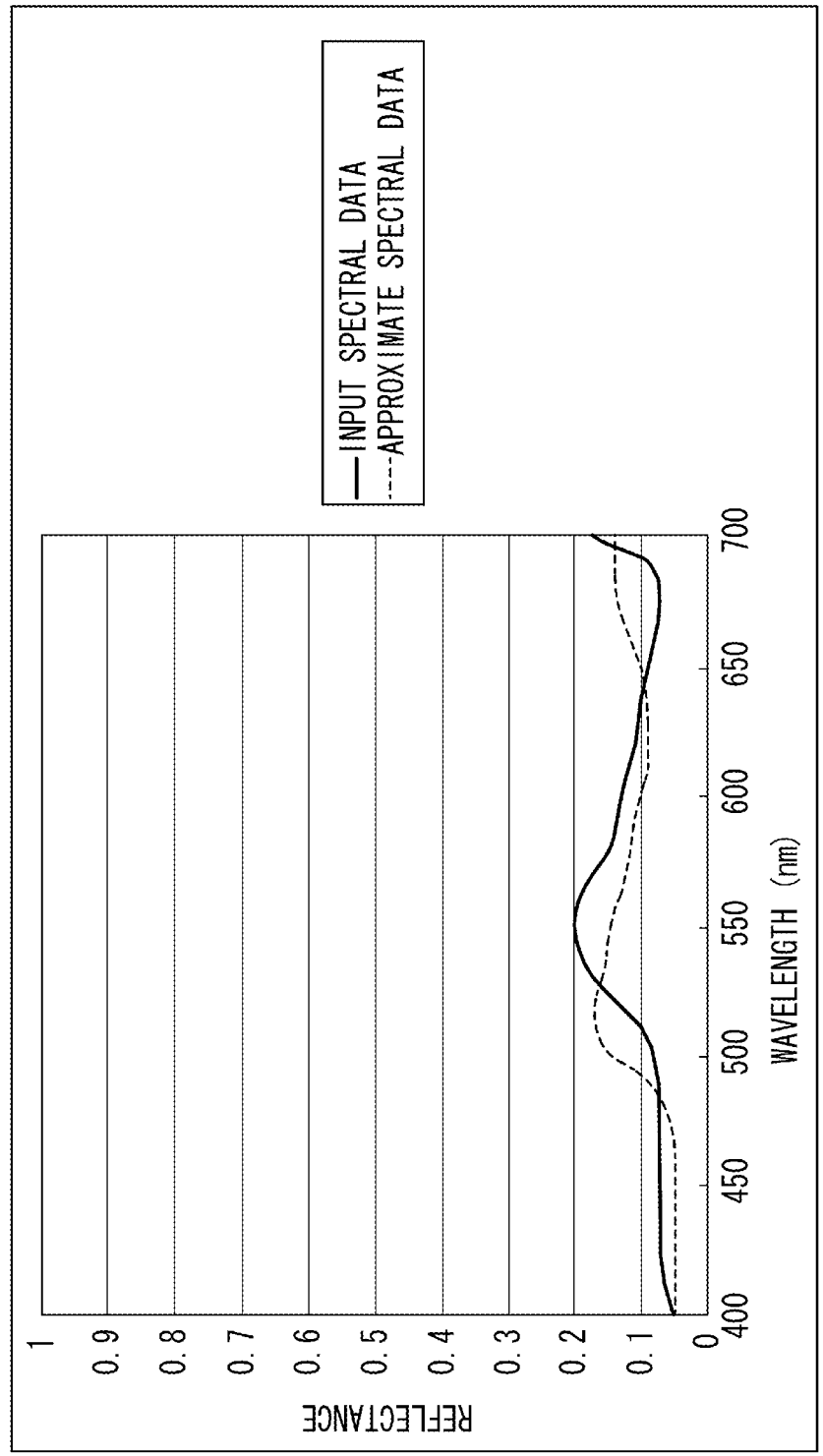

Results of approximating the input spectral data by Formula 5 wherein N is set to 3 are illustrated in FIGS. 6A and 6B. FIG. 6A illustrates an approximation result (approximate spectral data) when the principal component data calculated from the reference spectral data of the Group A (spectral reflectances of leaves) is used with respect to one-color data in the spectral reflectances illustrated in FIGS. 6A and 6B. FIG. 6B illustrates an approximation result (approximate spectral data) when the principal component data calculated from the reference spectral data of the Group B (spectral reflectances of prints) is used. It is evident from FIGS. 6A and 6B that when the spectral reflectances of leaves are used as the input spectral data, approximations can be made more precisely if the principal component data calculated from the reference spectral data of the Group A containing the spectral reflectances of leaves, which corresponds to the input spectral data, is used.

The error calculation unit 8 calculates an error between approximate spectral data approximated by targeting the input spectral data and the input spectral data itself. As the calculation method of an error, for example, using an RMS error as represented by Formula 7 can be considered.

$$Err\_i = \sqrt{\frac{\sum_{\lambda=400}^{700} (o_\lambda - r_\lambda)^2}{31}} \qquad \text{[Formula 7]}$$

$o_\lambda$: Reflectance of input spectral data at wavelength $\lambda$
$r_\lambda$: Reflectance of approximate spectral data at wavelength $\lambda$ In the above exemplary embodiment, however, the calculation method of an error is not limited to the RMS error of input spectral data and approximate spectral data. If, for example, as illustrated in FIG. 7, the number of principal components used for approximation is changed, the RMS error also changes. Thus, for example, an arbitrary threshold may be set to the RMS error to set the minimum number of principal components that can make approximations with an error below the threshold as an error value. In other words, a method for forming the smallest group with the minimum number of principal components below the threshold can be considered. Alternatively, a method for using a total sum of RMS errors when the number of principal components is changed as an error value can be considered.

Next, a second exemplary embodiment will be described. In the first exemplary embodiment, input spectral data itself is used as a characteristic amount of the input spectral data. Also in the first exemplary embodiment, approximate spectral data obtained by approximating input spectral data by using only lower-order principal component data of principal component data calculated by principal component analysis of reference spectral data is used as a characteristic amount of the reference spectral data. In the second exemplary embodiment, by contrast, a method will be described which uses differences of reflectances at a plurality of wavelengths set in advance by a user as characteristic amounts of input spectral data and reference spectral data.

Figure 8:
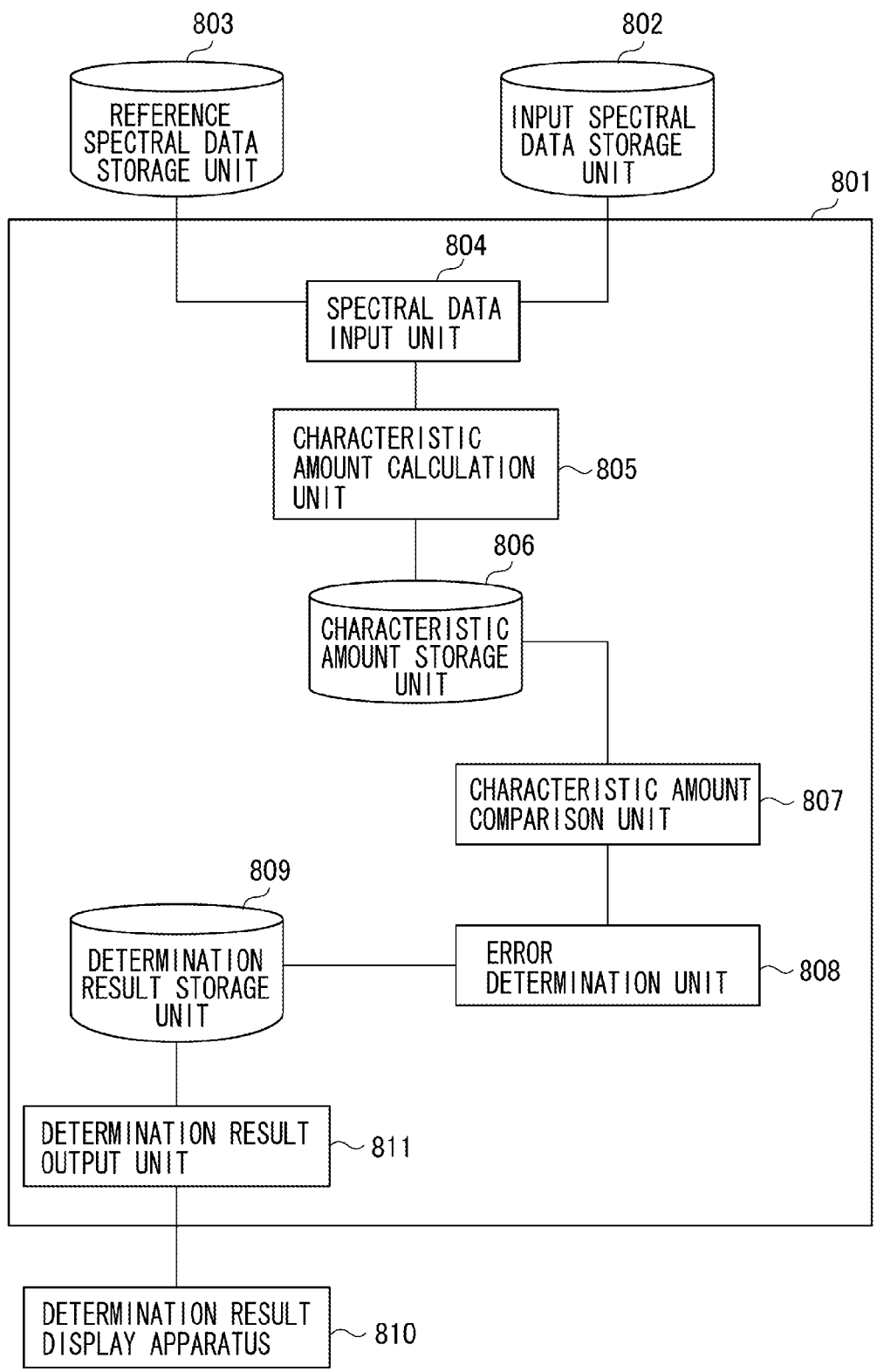
FIG. 8 illustrates a configuration of an image processing apparatus according to a second exemplary embodiment.

FIG. 8 illustrates a configuration of an image processing apparatus 801 according to the second exemplary embodiment. An input spectral data storage unit 802, a reference spectral data storage unit 803, and a spectral data input unit 804 in FIG. 8 are the same as the input spectral data storage unit 2, the reference spectral data storage unit 3, and the spectral data input unit 4 in FIG. 1 respectively. Further, a determination result storage unit 809, a determination result output unit 811, and a determination result display apparatus 810 in FIG. 8 are the same as the determination result storage unit 10, the determination result output unit 12 and the determination result display apparatus 11 in FIG. 1 respectively. Therefore, the description of these components will not be repeated.

In FIG. 8, a characteristic amount calculation unit 805 calculates characteristic amounts of input spectral data and reference spectral data which are input from the spectral data input unit 804. A characteristic amount storage unit 806 stores the characteristic amounts calculated by the characteristic amount calculation unit 805. A characteristic amount comparison unit 807 compares the characteristic amount of the input spectral data and that of the reference spectral data stored in the characteristic amount storage unit 806 to calculate an error.

Figure 9:
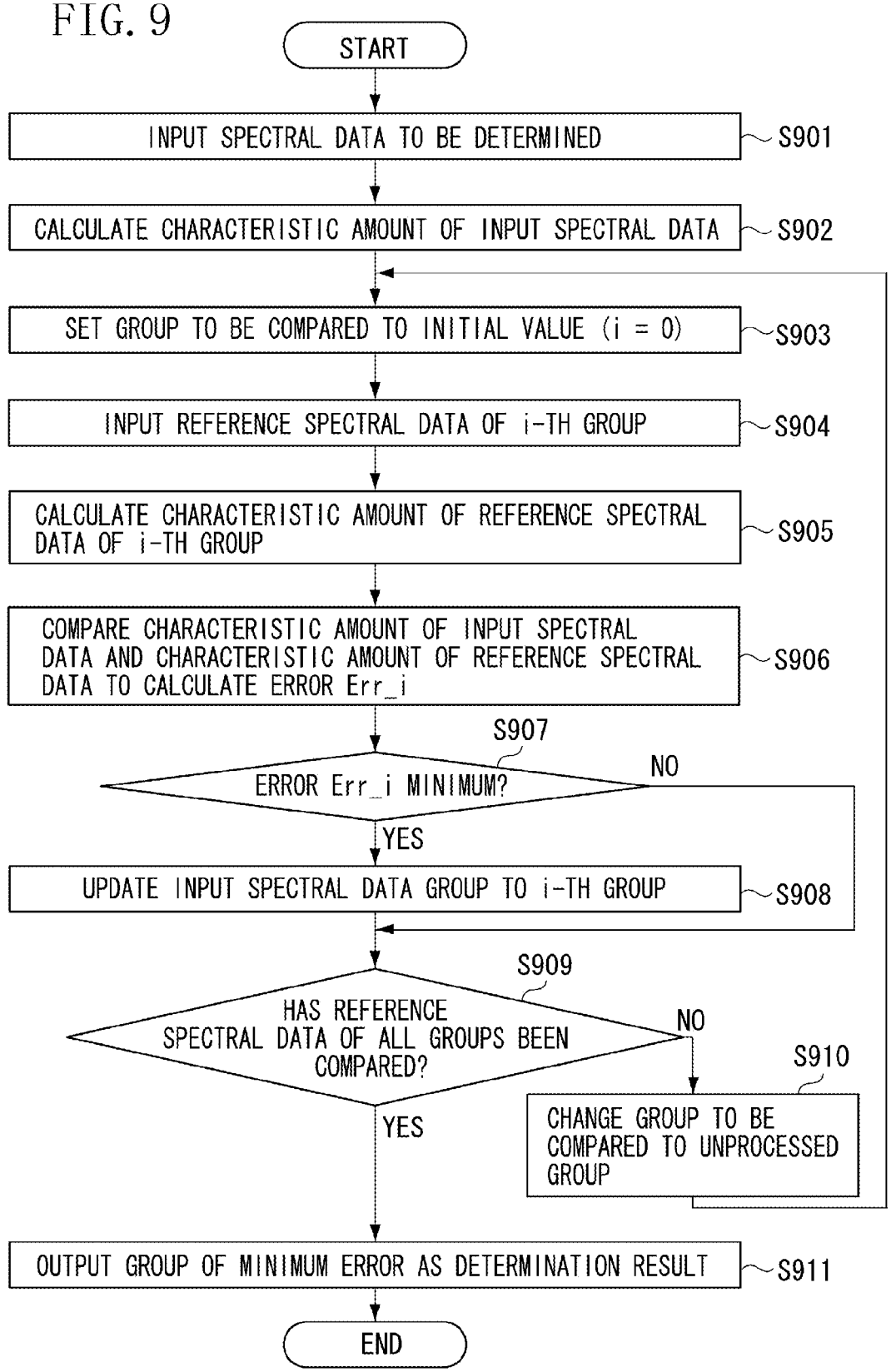
FIG. 9 is a flow chart illustrating the processing of the image processing apparatus according to the second exemplary embodiment.
Figure 10:
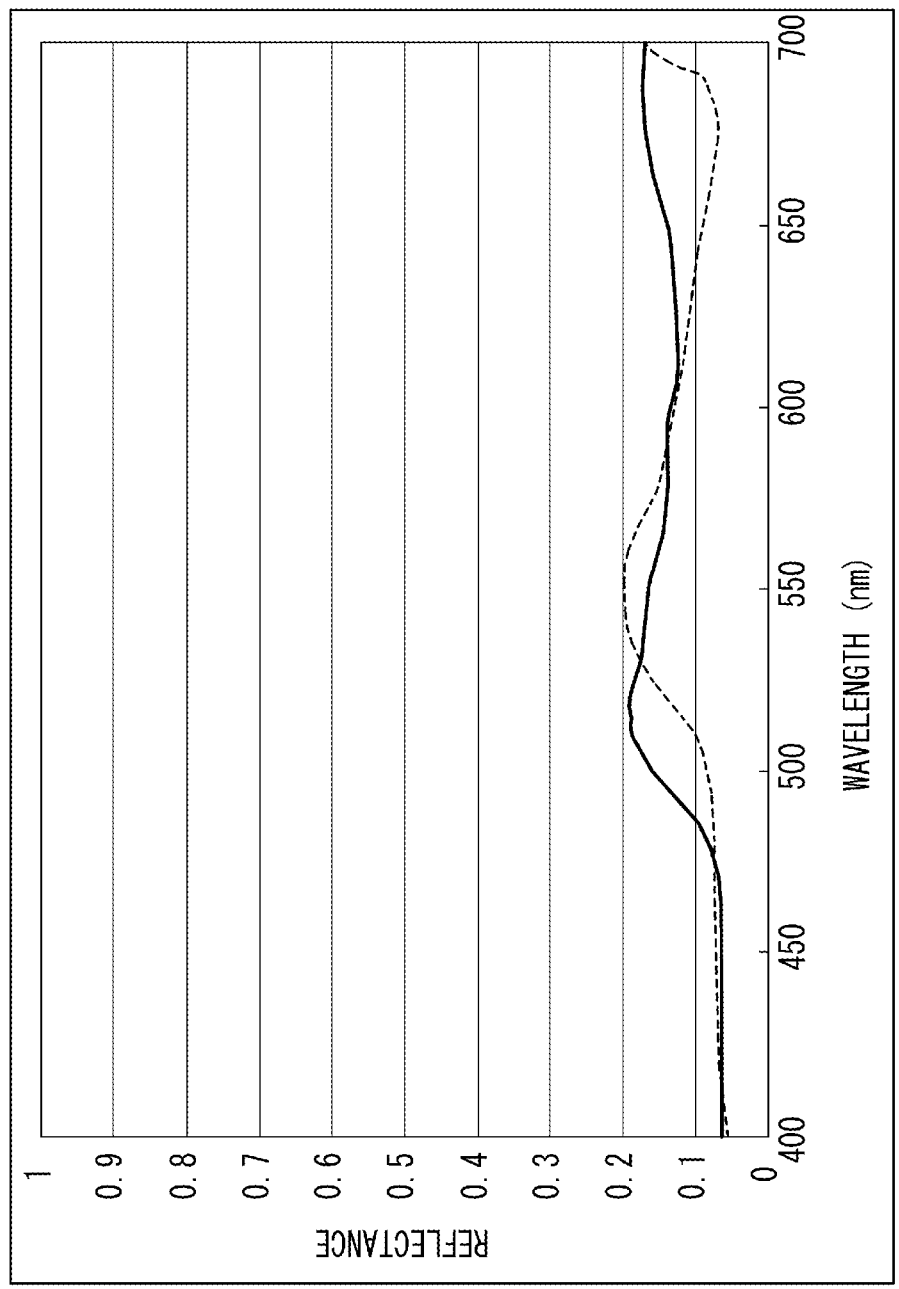
FIG. 10 illustrates an example of two spectral reflectances according to an exemplary embodiment.

FIG. 9 is a flow chart illustrating the processing of the image processing apparatus according to the second exemplary embodiment. The processing of the image processing apparatus according to the second exemplary embodiment will be described below with reference to FIG. 9.

In step S901, the spectral data input unit 804 reads input spectral data to be determined which is stored in the input spectral data storage unit 802. In step S902, the characteristic amount calculation unit 805 calculates a characteristic amount of the input spectral data read in step S901 and stores the characteristic amount in the characteristic amount storage unit 806.

In step S903, the spectral data input unit 804 sets a group to be compared to an initial value (i=0). In step S904, the spectral data input unit 804 reads reference spectral data belonging to the group (i-th group) set in step S903 from among the reference spectral data stored in the reference spectral data storage unit 803.

In step S905, the characteristic amount calculation unit 805 calculates a characteristic amount of the reference spectral data read in step S904 and stores the characteristic amount in the characteristic amount storage unit 806.

In step S906, the characteristic amount comparison unit 807 compares the characteristic amount of the input spectral data and that of the reference spectral data stored in the characteristic amount storage unit 806 to calculate an error $Err_{\_i}$.

In step S907, an error determination unit 808 compares the error $Err_{\_i}$ calculated in step S906 and errors ($Err_{\_0}$ to $Err_{\_(i-1)}$) in each group calculated heretofore to determine whether the error $Err_{\_i}$ is the minimum. If the error $Err_{\_i}$ is the minimum (YES in step S907), the processing proceeds to step S908. On the other hand, if the error $Err_{\_i}$ is not the minimum (NO in step S907), the processing proceeds to step S909.

Subsequent steps S908 to S911 are similar to steps S207 to S211 in the first exemplary embodiment and thus, the description thereof is omitted.

Next, the method for calculating the characteristic amount of the input spectral data in step S902 and the characteristic amount of the reference spectral data in step S905 will be described. Difference values between the reflectance at wavelength of 550 nm and the reflectance at wavelength of 650 nm of the input spectral data and the reference spectral data are used as the characteristic amounts.

If, as described above, the input spectral data O is represented by Formula 1, a characteristic amount $V_{in}$ of the input spectral data, that is, a difference between the reflectance at wavelength of 550 nm and the reflectance at wavelength of 650 nm is calculated by Formula 8. The present processing is a processing example of a first calculation unit.

$$V_{in} = o_{550} - o_{650}$$

If M pieces of reference spectral data are grouped in the group i and spectral data of the m-th reference spectral data of the group i at wavelength λ is $r_{i\_m\_\lambda}$, a characteristic amount $V_{ref\_i}$ of the group i is calculated by Formula 9.

$$V_{ref\_i} = \frac{\sum_{j=1}^{M}(r_{i\_m\_550} - r_{i\_m\_650})}{M} \qquad \text{[Formula 9]}$$

More specifically, the characteristic amount represented by Formula 9 is an average value of respective characteristic amounts of M pieces of spectral data contained in the reference spectral data. However, the calculated characteristic amount is not limited to the values represented by Formulae 8 and 9. For example, an average value or a variance value of reference spectral data may be used or a weighted linear sum of the average value, variance value, and a difference of reflectances between specific wavelengths may be used as a characteristic amount. The present processing is a processing example of a second calculation unit.

Next, the method for calculating an error between the characteristic amount of the input spectral data and that of the reference spectral data in step S906 is described. As described above, the characteristic amount comparison unit 807 calculates the error $Err_{\_i}$ of the characteristic amount by the characteristic amount $V_{in}$ of the input spectral data and the characteristic amount $V_{ref\_i}$ of the reference spectral data of the i-th group by Formula 10.

$$Err_{\_i} = \sqrt{(V_{in} - V_{ref\_i})^2} \qquad \text{[Formula 10]}$$

In other words, the error $Err_{\_i}$ becomes smaller with increasingly closer the characteristics of the input spectral data and the reference spectral data.

In the above described exemplary embodiments, spectral data to be processed is described as 31-dimensional data obtained by sampling the wavelength range of 400 nm to 700 nm at intervals of 10 nm, but needless to say, the wavelength range and the wavelength interval are not limited to the above examples. Any wavelength range and interval desired by the user may be used and, for example, 401-dimensional spectral data obtained by sampling the wavelength range of 380 nm to 780 nm at intervals of 1 nm may be used.

In the above described exemplary embodiments, the characteristic amount calculated from input spectral data and that calculated from reference spectral data grouped in advance are compared to determine to which group characteristics of the input spectral data belong. Therefore, even when no reference spectral data matching input spectral data is present, it is possible to determine the group of the reference spectral data having characteristics close to the characteristics of the input spectral data. Thus, the input spectral data can be categorized with high precision.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-276125 filed Dec. 10, 2010, which is hereby incorporated by reference herein in its entirety.

What is claimed is:

1. An information processing apparatus for determining a group corresponding to input spectral data input thereto from among a plurality of groups, the information processing apparatus comprising:
   an input unit configured to input principal component data obtained by performing a principal component analysis on a plurality of pieces of reference spectral data for each of the plurality of groups;
   a calculation unit configured to calculate a difference between approximate spectral data obtained by approximating the input spectral data using the principal component data and the input spectral data for each of the plurality of groups; and
   a determination unit configured to determine a group corresponding to the input spectral data from the difference calculated by the calculation unit.

2. The information processing apparatus according to claim 1, wherein the determination unit determines a group for which a difference calculated by the calculation unit becomes a minimum as the group corresponding to the input spectral data.

3. The information processing apparatus according to claim 1, wherein the calculation unit calculates a difference between approximate spectral data obtained by an approximation using principal component data having less dimensionality than a dimensionality of the reference spectral data and the input spectral data.

4. The information processing apparatus according to claim 3, wherein the dimensionality of the reference spectral data is three.

5. The information processing apparatus according to claim 1, wherein the difference is a root mean square (RMS) error.

6. The information processing apparatus according to claim 1, wherein the calculation unit calculates a difference between approximate spectral data obtained by an approximation using principal component data including a minimum number of principal components that are lower than a threshold and the input spectral data.

7. The information processing apparatus according to claim 1, wherein the difference is a difference between a plurality of wavelengths.

8. A method for information processing that determines a group corresponding to input spectral data that is input from among a plurality of groups, the method comprising:
   inputting principal component data obtained by performing a principal component analysis on a plurality of pieces of reference spectral data for each of the plurality of groups;
   calculating a difference between approximate spectral data obtained by approximating the input spectral data using the principal component data and the input spectral data for each of the plurality of groups; and
   determining a group corresponding to the input spectral data from the calculated difference.

9. A non-transitive computer-readable storage medium storing a computer-executable program for determining a group corresponding to input spectral data that is input from among a plurality of groups, the program comprising codes for:
   inputting principal component data obtained by performing a principal component analysis on a plurality of pieces of reference spectral data for each of the plurality of groups;
   calculating a difference between approximate spectral data obtained by approximating the input spectral data using the principal component data and the input spectral data for each of the plurality of groups; and
   determining a group corresponding to the input spectral data from the calculated difference.

* * * * *